(12) United States Patent
Krieg et al.

(10) Patent No.: US 9,208,670 B2
(45) Date of Patent: Dec. 8, 2015

(54) WARNING SYSTEM FOR MONITORING A VEHICLE BATTERY

(71) Applicants: Robert Bosch GmbH, Stuttgart (DE); Samsung SDI Co., Ltd., Yongin-si, Gyeonggi-do (KR)

(72) Inventors: Berengar Krieg, Gerlingen (DE); Andreas Heyl, Ludwigsburg (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 14/094,914

(22) Filed: Dec. 3, 2013

(65) Prior Publication Data

US 2014/0152445 A1   Jun. 5, 2014

(30) Foreign Application Priority Data

Dec. 3, 2012   (DE) .......................... 10 2012 222 070

(51) Int. Cl.

| | |
|---|---|
| *B60Q 1/00* | (2006.01) |
| *G08B 17/00* | (2006.01) |
| *H02J 7/00* | (2006.01) |
| *H02J 7/16* | (2006.01) |
| *B60K 1/00* | (2006.01) |
| *G01R 31/36* | (2006.01) |
| *B60W 20/00* | (2006.01) |
| *B60L 11/18* | (2006.01) |
| *B60L 15/40* | (2006.01) |
| *A62C 3/07* | (2006.01) |
| *A62C 3/16* | (2006.01) |

(52) U.S. Cl.
CPC ............. *G08B 17/00* (2013.01); *B60L 11/1851* (2013.01); *B60L 15/40* (2013.01); *B60W 20/00* (2013.01); *A62C 3/07* (2013.01); *A62C 3/16* (2013.01); *B60Y 2400/214* (2013.01)

(58) Field of Classification Search
CPC ........................................................ G08B 17/00
USPC ........................................................ 340/584
See application file for complete search history.

(56) References Cited

U.S. PATENT DOCUMENTS

| | | | | |
|---|---|---|---|---|
| 5,202,617 | A * | 4/1993 | Nor ................... | 320/130 |
| 8,037,954 | B2 * | 10/2011 | Taguchi ............. | 180/65.1 |
| 8,667,690 | B2 * | 3/2014 | Cajiga et al. ........ | 29/897.3 |
| 8,729,857 | B2 * | 5/2014 | Stahlin et al. ....... | 320/109 |
| 8,890,475 | B1 * | 11/2014 | Becker ............... | 320/109 |
| 2008/0051964 | A1 * | 2/2008 | Maeda ............... | 701/70 |
| 2010/0017045 | A1 * | 1/2010 | Nesler et al. ........ | 700/296 |
| 2010/0072946 | A1 * | 3/2010 | Sugano .............. | 320/108 |
| 2010/0211340 | A1 * | 8/2010 | Lowenthal et al. ... | 702/63 |
| 2011/0175569 | A1 * | 7/2011 | Austin ............... | 320/109 |

(Continued)

FOREIGN PATENT DOCUMENTS

| | | |
|---|---|---|
| DE | 10 2009 046 496 A1 | 5/2011 |
| JP | 2012-200103 A | 10/2012 |

*Primary Examiner* — Jennifer Mehmood
*Assistant Examiner* — John Mortell
(74) *Attorney, Agent, or Firm* — Maginot, Moore & Beck LLP

(57) ABSTRACT

A warning system for detecting a battery fire in a battery of an electric or hybrid vehicle includes a battery management system. The electric or hybrid vehicle is parked at or in a building to carry out a battery charging operation. The battery management system is connected to a building network installed in the building during the charging operation either via a direct connection or via a wireless connection. The battery management system triggers or activates protective measures if a fire is detected.

15 Claims, 1 Drawing Sheet

(56) References Cited

U.S. PATENT DOCUMENTS

| | | | |
|---|---|---|---|
| 2011/0215758 A1* | 9/2011 | Stahlin et al. | 320/109 |
| 2012/0236149 A1* | 9/2012 | Nagy | 348/148 |
| 2012/0249065 A1* | 10/2012 | Bissonette et al. | 320/109 |
| 2013/0127611 A1* | 5/2013 | Bernstein et al. | 340/455 |
| 2014/0021914 A1* | 1/2014 | Martin et al. | 320/109 |
| 2014/0306658 A1* | 10/2014 | Kinomura | 320/109 |

* cited by examiner

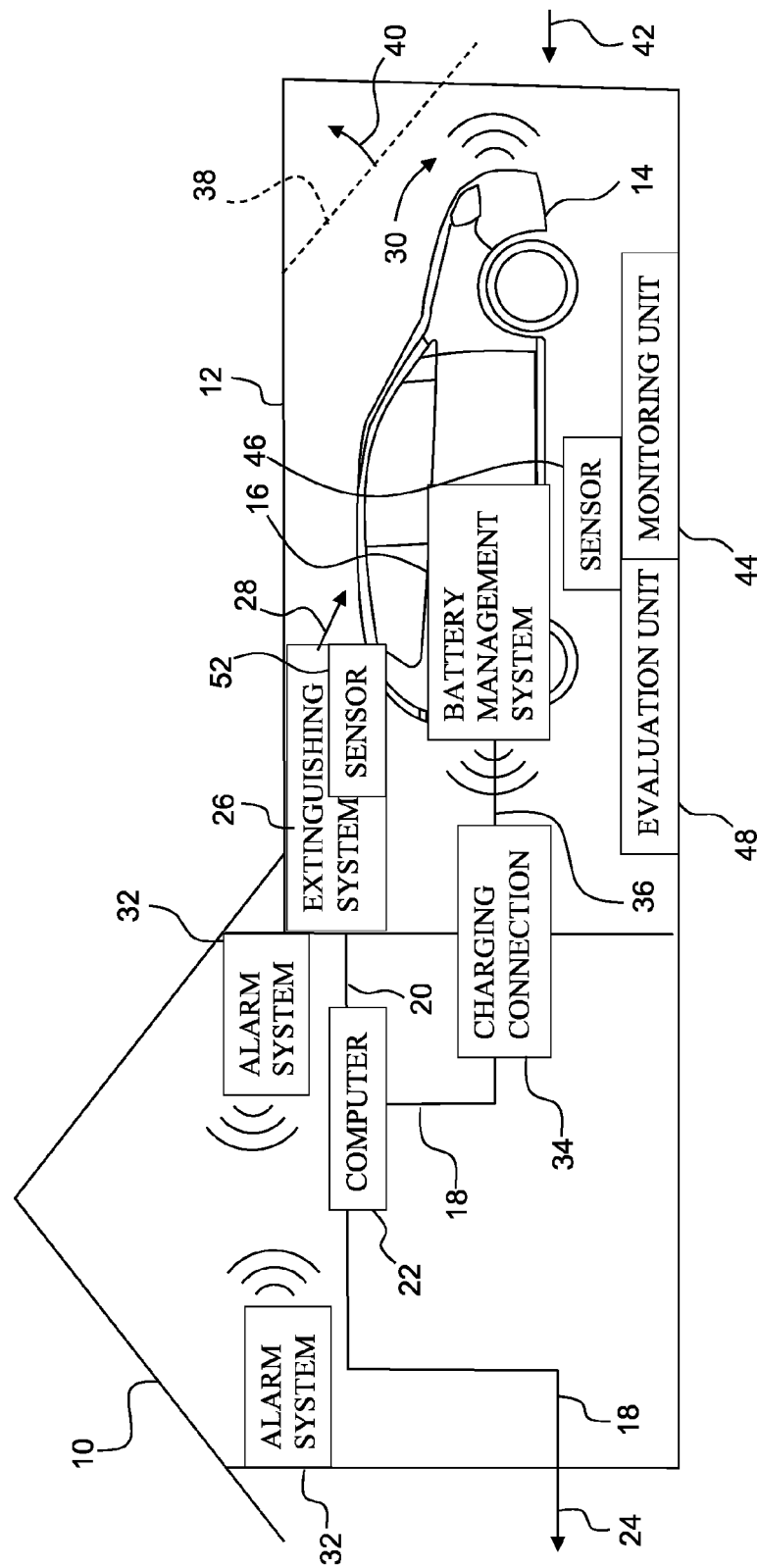

WARNING SYSTEM FOR MONITORING A VEHICLE BATTERY

This application claims priority under 35 U.S.C. §119 to patent application no. DE 10 2012 222 070.4 filed on Dec. 3, 2012 in Germany, the disclosure of which is incorporated herein by reference in its entirety.

BACKGROUND

In the case of hybrid vehicles, in particular in the case of electric vehicles, which are connected to domestically conventional sockets or the like (plug-in hybrid) for charging, charging is effected via external networks, for example the 220 V home network generally provided in the building. The batteries used in electric and also in hybrid vehicles are high-voltage batteries. Lithium ion cells, in particular, are currently used as high-voltage batteries.

Lithium ion battery cells may be damaged by excessively high charging currents. The battery cells may also be damaged by charging operations which last too long at excessively low temperatures. The damage occurring to the lithium ion battery cells may be such that an internal short circuit occurs in the battery cells. The internal short circuit may consequently result in a thermal chain reaction which is also referred to as "thermal runaway". In the extreme case, the thermal chain reaction which has occurred may result in a fire in the battery cell and possibly adjacent cells, that is to say an entire battery module in a battery pack of a hybrid or electric vehicle. A battery management system is provided for operating battery cells and battery modules formed from the latter in electric vehicles and hybrid vehicles. The task of the battery management system is to monitor the individual battery cells in the individual battery modules in the battery pack and to prevent the danger, which was outlined above and constitutes an extreme case, by monitoring the safety-relevant parameters and reliably precluding charging or operation of the battery cells in the battery modules outside the predefined specifications. However, it is theoretically possible for a fire to nevertheless occur either as a result of an incorrect design or as a result of non-linear chemical effects, which can therefore be controlled only with difficulty, inside the individual battery cells or as a result of prior damage to the battery cell, as outlined above, for example as a result of a production fault. If electric vehicles or hybrid vehicles in the form of a "plug-in hybrid" are charged, for example, overnight in a building or in a parking space at a building or inside a garage of the building or else an underground car park, such a battery cell or battery module fire which occurs may result in a fire in the entire building, in which, in the extreme case, even people who are in the building by chance and are not warned in good time, for example at night, may be harmed.

SUMMARY

The disclosure proposes a warning system for detecting a battery fire in a battery of an electric or hybrid vehicle which is provided with a battery management system and is parked at or in a building for carrying out a battery charging operation, the battery management system being connected to a building network installed in the building during the charging operation via a direct connection or via a wireless connection, and protective measures being able to be activated if a fire is detected. Since it can be expected in future that electronics will have a greater presence in buildings, in particular "smart grid" applications, the battery management system of an electric vehicle or hybrid vehicle, in a manner following the solution proposed according to the disclosure, can be connected to this intelligent building network or to another network provided in the building, for example a PC system, and can activate protective measures which are available in the building in the event of an emerging source of fire. As a result, the effects of the fire can be minimized and people sleeping in the building at night who possibly have not discovered an emerging fire early enough can be warned in good time.

The disclosure provides for a battery management system to be used in the warning system, which battery management system reliably detects a battery fire, in a manner assisted by corresponding sensors and evaluation units, by measuring and checking the plausibility of, for example, battery characteristic variables such as voltage and temperature. The battery management system comprises temperature sensors which reliably detect the rise in a temperature T above a particular temperature threshold $T_{max}$ which is just still permissible and activate corresponding protective measures.

In one possible configuration variant of the solution proposed according to the disclosure, the battery management system can be connected to a building network via a charging cable, for example. Alternatively, instead of a direct connection between the battery management system and the building network, it is possible to provide a wireless connection, for example a radio connection, a WLAN connection or a Bluetooth connection, with the result that triggering messages from the battery management system with regard to the initiation of protective measures in or at the building are reliably transmitted to the building network. For example, after appropriately notifying the building network, the battery management system can activate an extinguishing system which is connected to said network and can be triggered via the building network. Assuming that this activatable extinguishing system is installed in a garage or an underground car park, for example, and contains a suitable extinguishing agent which is suitable for extinguishing battery fires in lithium ion batteries, a source of fire can be extinguished before it spreads over the entire electric or hybrid vehicle or strikes the building or parts of the latter. On the other hand, with appropriate feedback from the battery management system of the electric or hybrid vehicle to the network installed in the building, it is possible to activate an alarm system which is installed in the building and wakes up people located or sleeping inside the building, for example. An acoustic alarm would be preferred in this case.

Alternatively, it is possible for the battery management system of the hybrid or electric vehicle, which communicates with the network installed in the building via a direct connection in the form of a charging cable or else via the wireless connections mentioned, to inform an external notification office, for example a fire station or the German agency for technical relief, via an external connecting line.

If the direct connection or else the wireless connection between the battery management system of the electric vehicle or hybrid vehicle and the network installed in the building is interrupted, the battery management system can also activate an alarm system provided in the vehicle if appropriate messages are detected and their plausibility is checked, which would likewise preferably have to be effected acoustically in order to achieve an early warning function. A possible source of fire will initially start from the vehicle and, in the worst case scenario, will only subsequently strike a garage, an underground car park or possibly also a residential or business building, with the result that there is an appropriate advance warning time when the vehicle-internal alarm system is initialized by the battery management system.

An excessively high charging current can also result in a local fire, for example in a charging station, this local fire spreading to the electric vehicle or hybrid vehicle. Protective measures, that is to say informing the building network or activating the alarm systems mentioned, can accordingly also be activated from another control device which is able, however, to discover a critical temperature increase in the battery region of the electric vehicle or hybrid vehicle.

In one configuration, an alarm system in the electric vehicle is activated via a vehicle-external control device assigned to the building charging connection.

In another configuration of the warning system proposed according to the disclosure, the latter can also monitor a deactivated battery management system of a hybrid or electric vehicle. During the charging operation at a socket on the 220 V domestic power supply network, the battery management system of an electric vehicle or hybrid vehicle is generally active and can immediately detect a fire. In order to also detect a fire when the battery management system is deactivated, an additional monitoring unit may be provided. The latter comprises at least one temperature sensor and an evaluation unit. As a result, the additional monitoring unit is able to detect when a critical temperature threshold is locally exceeded. Furthermore, it is possible for this additional monitoring unit to inform the building network or the alarm system installed in the building or an extinguishing system of the fire directly, for example by activating a corresponding hardware line connection. In a modification of this procedure, the network provided in the building or the alarm system could also be informed of an arising fire indirectly via a wake-up call of a superordinate control device using the additional monitoring unit. This additional monitoring unit may ideally have a low quiescent power consumption, with the result that the energy consumption for implementing this safety function remains limited.

The warning system proposed according to the disclosure also makes it possible to carry out a charging operation on battery packs of an electric vehicle or hybrid vehicle at night without compromising safety. In this case, it is insignificant whether the battery cells in the battery modules in the battery pack are charged in the vicinity of a building, a garage or in an underground car park. The continuous monitoring of the charging operation by the activated battery management system ensures that the plausibility of impermissible deviations with respect to the temperature or battery voltage and other characteristic variables is checked, with the result that false alarms do not occur and a network installed in the building triggers protective measures only in the event of a looming danger. If, for safety and building inspectorate reasons, charging stations for hybrid or electric vehicles are to be provided with extinguishing systems filled with an extinguishing medium which extinguishes fires in lithium ion batteries, this extinguishing system can be integrated in the warning system proposed according to the disclosure using the solution proposed according to the disclosure. The extinguishing system which is suitable for extinguishing a fire arising from a lithium ion battery is very close to the potential source of fire, with the result that an arising fire can be quickly stifled, which affords precious advance warning and rescue time for people in an adjacent building and on floors above a garage, with the result that sufficient time remains for evacuating people located and possibly sleeping in the building. The warning system proposed according to the disclosure can also be easily used to simultaneously initialize the extinguishing system combined with a message to a fire station or another notification office via an external connection.

If the battery management system is deactivated, it is possible to monitor the latter using an additional monitoring unit in the vehicle. A further control device having a low energy consumption in the vehicle is suitable for this purpose.

The warning system proposed according to the disclosure makes it possible to extend periods which are required for evacuation and can therefore be used to rescue people. Since an extinguishing system is generally installed in close proximity to the electric vehicle or hybrid vehicle, immediate intervention can be effected the plausibility checking of detection of a battery fire, either by the active battery management system or the additional monitoring unit, before an arising fire spreads further.

BRIEF DESCRIPTION OF THE DRAWING

The FIGURE schematically shows the components of the warning system proposed according to the disclosure, comprising a building, its building network and an electric or hybrid vehicle which is connected to a building charging station.

DETAILED DESCRIPTION

The FIGURE shows the components of the warning system proposed according to the disclosure, comprising a building with a network installed in the building, and a garage in which an electric or hybrid vehicle which is connected to a building charging station is located.

As the FIGURE shows, a building 10, which may be a commercially used building, an office building or a residential building, a terraced house, an apartment building, a detached house or the like, comprises a garage 12. The garage 12, indicated here as an attached garage of a building 10, may also be a single-storey or multi-storey underground car park or the like. The FIGURE shows that an electric vehicle 14 is parked in the garage 12 at the building 10. The electric or hybrid vehicle 14 comprises a battery management system 16. The battery management system 16 in turn comprises at least one temperature sensor and control devices, in particular sensor control devices for monitoring the individual battery cells in a battery used to drive the electric or hybrid vehicle 14.

It is clear from the FIGURE that, in the case illustrated, the battery management system 16 of the electric or hybrid vehicle 14 is connected to a building charging connection 34 via a direct connection, a charging cable 36 in this case. The vehicle battery is charged at night (plug-in hybrid) via this building charging connection which is in turn again connected to the building 220 V domestic power supply network.

The building 10, whose individual floors are not indicated here, contains a building network 8 ("smart grid"). The building network 18 comprises network connections 20, a central computer 22 and the building charging connection 34. An extinguishing system 26 which, in the example illustrated according to the FIGURE, is located below the ceiling of the garage 12 in which the electric vehicle 14 is parked is connected to the central computer 22 of the building network 18.

In the example illustrated, the garage 12 is closed by means of a garage door 38 which carries out a pivoting-open movement 40 in the dashed position corresponding to the arrow in the FIGURE, thus producing an entrance 42 to the garage 12 on the side of the garage 12 facing away from the building 10.

The battery management system 16 which is installed in the electric or hybrid vehicle 14 immediately detects a battery fire when it arises. Arising battery fires are usually caused by a thermal chain reaction which is also referred to as "thermal runaway". An arising "thermal runaway" can be detected by measuring and checking the plausibility of characteristic variables, for example the battery cell voltage and the current. The battery management system 16 of the electric or hybrid vehicle 14 is likewise able to discover a battery cell fire or a battery module fire by measuring the temperature using at least one temperature sensor. The battery management system 16 detects an impermissible rise of a battery temperature T and detects when a temperature limit value $T_{max}$ is exceeded.

As is clear from the illustration according to the FIGURE, the battery management system 16 is connected to the building charging connection 34 in this case via a direct connection formed by the charging cable 36. Instead of the direct connection 36—as illustrated in FIG. 1—there may also be a wireless connection 50 between the battery management system 16 of the electric or hybrid vehicle 14 and the building network 18. The wireless connection 50 may be provided, for example, by a WLAN connection, a radio connection or a Bluetooth connection.

In order to implement the warning system proposed according to the disclosure, the extinguishing system 26, which is a protective measure 28, is situated in the garage. Spray jets of the extinguishing medium from the extinguishing system are directed at the electric or hybrid vehicle 14. Furthermore, it is mentioned that the building 10 and garage 12 comprise a building-internal alarm system 32 which is connected to the building network 18. Reference symbol 24 is used to denote the connecting line which runs out to an external notification office, for example the fire brigade. At least one smoke and/or gas sensor 52 which is used to detect smoke, hydrogen fluoride or similar poisonous gases and can be connected to the building network may also be provided on the extinguishing system 26, with the result that corresponding measures can be initiated, for example gas or smoke can be suctioned off or rendered harmless in another manner.

The method of operation of the warning system proposed according to the disclosure is as follows:

When the battery management system 16 is activated, the temperature or battery cell voltage or battery current is continuously measured during the operation of charging the battery of the electric vehicle or hybrid vehicle 14 which is connected to the building charging connection 34 via the charging cable 36. In the case of the direct connection 36 by means of the charging cable, communication between the building network 18 and the battery management system 16 is also carried out via the charging cable 36. If it is detected that at least one battery cell exceeds the temperature or if a thermal chain reaction is detected, this is examined for plausibility in the battery management system 16 in order to avoid false alarms.

If the plausibility of the measurement is checked, corresponding warning signals are transmitted to the building network 18 and therefore to the central computer 22 of the building network 18 via the direct connection 36, the building charging connection 34. The extinguishing system 26 provided under the ceiling of the garage 12, for example, can be activated via the network connection 20. This sprayed extinguishing medium is able to extinguish a lithium ion battery fire. Furthermore, a building-internal alarm system 32 can be activated via the central computer 22 of the network 18 installed in the building, with the result that people in the building 10 are warned or even people sleeping there are woken up in good time. The earlier the building-internal alarm system 32 is activated, the greater the period of time available for evacuating the building 10—just think of drowsy residents or young children or elderly or frailer people. In addition, an external notification office, for example a fire station, a police station, the German agency for technical relief or the like, can be alerted via the network 18 installed in the building by activating an external connection 24. When the battery management system 16 is active, it is therefore possible to activate the extinguishing system 26 via the building-internal network 18, to simultaneously inform an external notification office via the external connection 24 and, if necessary, to activate further protective measures provided in the building 10 in the form of an alarm system 32. The schematic illustration of a single garage 12 adjoining a building 10 in FIG. 1 likewise applies in the same manner to underground car parks and multi-storey residential buildings or office buildings at which charging stations for electric or hybrid vehicles 14 are provided.

In further configurations of the warning system proposed according to the disclosure (not illustrated in the drawing here), it is possible for the battery management system 16 of the electric or hybrid vehicle to activate the vehicle-internal alarm system 30 of the electric or hybrid vehicle 14, in the event of the direct connection 36 or a wireless connection 50 being interrupted, as soon as the emergence of a battery fire has been detected after a corresponding plausibility check. As long as the battery fire arises, the electric or hybrid vehicle 14 is able to emit corresponding alarm signals in order to warn people in the building 10 or to wake up people possibly sleeping in the building 10, with the result that sufficient time is available for evacuating them from the building 10.

In a further configuration of the warning system proposed according to the disclosure, in addition to a battery fire, it is also possible to detect an excessively high charging current which possibly be detected in a local fire, for example at the building charging connection 34, which could spread to the electric or hybrid vehicle 14. Protective measures 28, that is to say informing the building network 18 or activating the building-internal alarm system 32 or activating the extinguishing system 20, can therefore also be activated from another control device, for example a charging device which measures the current but is able to discover a critical temperature increase by means of temperature sensors.

The battery management system 16 of an electric or hybrid vehicle 14 is generally active during an operation of charging the vehicle battery and monitors this operation. If the battery management system 16 is deactivated and in order to also be able to detect a fire in this case, an additional monitoring unit 44, as schematically arranged below the electric/hybrid vehicle 14 in FIG. 1, is advantageous. This additional monitoring unit 44 comprises at least one temperature sensor 46 and an evaluation unit 48. The additional monitoring unit 44 is able to locally detect when a critical temperature threshold $T_{max}$ is exceeded and also to check the plausibility of this measurement. Furthermore, the building network 18 and the building-internal alarm system 32 can be indirectly informed of the fire using the additional monitoring unit 44 via a "wake-up call" of a superordinate control device. The superordinate control device is, for example, a vehicle management computer provided in the vehicle.

The additional monitoring unit 44—here alternatively indicated as a vehicle-external part of the garage 12—is continuously supplied using a weak quiescent current, with the result that the required energy consumption needed to maintain this safety function is minimized.

What is claimed is:
1. A warning system for detecting an impermissible battery temperature in a battery of an electric or hybrid vehicle parked at or in a building for carrying out a battery charging operation, comprising:

a building network installed in the building, the building network including at least one activatable protective measure; and a battery management system located within the vehicle and operably connected to the building network during the charging operation, the battery management system configured to determine the impermissible battery temperature and activate the at least one activatable protective measure.

2. The warning system according to claim 1, wherein the battery management system is configured to determine the impermissible battery temperature by measuring and checking the plausibility of battery characteristic variables.

3. The warning system according to claim 1, wherein the battery management system comprises temperature sensors and is configured to determine the impermissible battery temperature based upon a rise in a temperature of the battery above a temperature threshold.

4. The warning system according to claim 1, wherein the battery management system is operably connected to the building network through a charging cable.

5. The warning system according to claim 1, wherein the battery management system is operably connected to the building network through a WLAN connection, a radio connection, or a Bluetooth connection.

6. The warning system according to claim 1, wherein the at least activatable one protective measure comprises an extinguishing system connected to the building network and configured to be triggered via the building network.

7. The warning system according to claim 1, wherein the at least activatable one protective measure comprises a building alarm system configured to be triggered via the building network.

8. The warning system according to claim 1, wherein the building network is connected to an external notification office via an external connection.

9. The warning system according to claim 1, wherein the battery management system is configured to activate a vehicle alarm system of the electric or hybrid vehicle if the operable connection to the building network is interrupted.

10. The warning system according to claim 1, wherein an alarm system in the electric vehicle is activated via a vehicle-external control device assigned to the building charging connection.

11. The warning system according to claim 1, further comprising an additional vehicle-internal monitoring unit configured to detect when a critical temperature threshold is exceeded when the battery management system is switched off and activate the at least one activatable protective measure.

12. The warning system according to claim 11, wherein the additional monitoring unit comprises at least one temperature sensor and an evaluation unit provided either at a charging station or on the electric vehicle.

13. The warning system according to claim 1, wherein the building network comprises one or more of at least one smoke sensor and at least one gas sensor.

14. The warning system according to claim 2, wherein the battery characteristic variables include one or more of voltage, temperature, and current.

15. The warning system according to claim 8, wherein the external notification office is a fire station or the German agency for technical relief.

* * * * *